United States Patent [19]

van Broekhoven

[11] Patent Number: 4,952,382
[45] Date of Patent: Aug. 28, 1990

[54] PROCESS FOR REMOVING SULFUR OXIDES WITH AN ABSORBENT WHICH CONTAIN AN ANIONIC CLAY

[75] Inventor: Emanuel H. van Broekhoven, Monnickendam, Netherlands

[73] Assignee: AKZO N.V., Netherlands

[21] Appl. No.: 354,243

[22] Filed: May 19, 1989

Related U.S. Application Data

[62] Division of Ser. No. 137,939, Dec. 28, 1987, Pat. No. 4,866,019.

[30] Foreign Application Priority Data

Jan. 13, 1987 [NL] Netherlands ............... 8700056

[51] Int. Cl.$^5$ .................... B01J 8/00; C01B 17/00
[52] U.S. Cl. ............................................. 423/244
[58] Field of Search .................... 423/244 R, 244 A

[56] References Cited

U.S. PATENT DOCUMENTS

| | | | |
|---|---|---|---|
| 3,252,757 | 5/1966 | Granquist | 23/111 |
| 3,252,889 | 5/1966 | Capell et al. | |
| 3,293,192 | 12/1966 | Maher et al. | 252/430 |
| 3,506,400 | 4/1970 | Eberly, Jr. et al. | 23/182 |
| 3,609,103 | 9/1971 | Gladrow et al. | 252/455 Z |
| 3,676,330 | 7/1972 | Plank et al. | 208/111 |
| 3,743,594 | 7/1973 | Mulaskey | 208/216 |
| 4,115,251 | 9/1978 | Flanders et al. | |
| 4,153,535 | 5/1979 | Vasalos et al. | |
| 4,182,693 | 1/1980 | Gladrow | 252/455 Z |
| 4,206,039 | 6/1980 | Vasalos | 208/120 |
| 4,218,307 | 8/1980 | McDaniel | |
| 4,454,244 | 6/1984 | Woltermann | |
| 4,458,026 | 7/1984 | Reichle | 502/80 |
| 4,459,371 | 7/1984 | Hobbs et al. | |
| 4,465,588 | 8/1984 | Occelli et al. | 208/120 |
| 4,497,902 | 5/1985 | Bertolacini et al. | 502/65 |
| 4,562,295 | 12/1985 | Miyata | |
| 4,613,428 | 9/1986 | Edison | |

FOREIGN PATENT DOCUMENTS

| | | |
|---|---|---|
| 0045170 | 2/1982 | European Pat. Off. |
| 0045175 | 2/1982 | European Pat. Off. |
| 0110702 | 6/1984 | European Pat. Off. |
| 7604264 | 10/1976 | Netherlands |
| 8606090 | 10/1986 | PCT Int'l Appl. |
| 1570932 | 7/1980 | United Kingdom |

OTHER PUBLICATIONS

Chemical Abstracts No. 105:179116d, vol. 105, 1986, p. 431.
C. V. McDaniel et al., "New Ultra-Stable Form of Faujasite", Soc. Chem. Ind. London, Monograph, *Molecular Sieves*, 1968, pp. 186–195.
Ulibarri et al., "Textural Properties of Hydrotalcite-Like Compounds", *Material Chemistry and Physics*, 14 (1986), pp. 569–579.
Pausch et al., "Synthesis of Disordered and Al-Rich Hydrotalcite-Like Compounds" *Clays and Clay Minerals*, vol. 34, No. 5, 1986, pp. 507–510.
Miyata, "Synthesis of New Hydrotalcite-Like Compounds and Their Physico-Chemical Properties", Chemistry letters, 1973, pp. 843–848.
Buttler et al., "Studies on $4CaO.Al_2O_3.13H_2O$ and the Related Natural Mineral Hydrocalumite", *Journal of the American Ceramic Society*, vol. 42, No. 3, pp. 121–127.
Miyata, "Physico-Chemical Properties of Sythetic Hydrotalcites in Relation to Composition", *Clays and Clay Minerals*, vol. 28, No. 1, 1980, pp. 50–56.
Miyata, "The Syntheses of Hydrotalcite-Like Compounds and Their Structures", etc., *Clays and Clay Materials*, vol. 23, 1975, pp. 369–375.
Paul B. Venuto et al., "Fluid Catalytic Cracking with Zeolite Catalysts", Chapter 6, Marcel Dekker, Inc., pp. 22–31.
Mylius, "Uber Calciumaluminathydrate Unc Deren Doppelsalze", Acta Acad. Aboensi Math. Phys. VII, 3, (1933).
Helv. Chim. Acta, 25, (1942), pp. 106–137 and 555–569.

*Primary Examiner*—Gregory A. Heller
*Attorney, Agent, or Firm*—Oliff & Berridge

[57] ABSTRACT

Disclosed are hydrocarbon conversion catalyst compositions, such as fluidizable cracking catalyst compositions, containing an anionic clay, e.g. a clay having a hydrotalcite, and ettringite or a hydrocalumite structure, for the conversion of sulphur-containing feedstocks, the anionic clay serving as sulphur oxides binding material. Also disclosed are absorbents containing the anionic clay embedded in a matrix. The absorbents may be used to purify sulphur oxides-containing gases.

9 Claims, No Drawings

PROCESS FOR REMOVING SULFUR OXIDES WITH AN ABSORBENT WHICH CONTAIN AN ANIONIC CLAY

This is a division of application Ser. No. 07/137,939 filed Dec. 28, 1987 now U.S. Pat. No. 4,866,019.

The invention relates to a catalyst composition for converting hydrocarbon feed, which composition contains a catalytically active material, a sulphur oxides binding material and a matrix material.

Hydrocarbons are generally converted catalytically in a process in which the hydrocarbon feed is brought into contact with fluidized catalyst particles under appropriate conditions in a reaction zone. In the process the catalyst particles are gradually deactivated in that as byproduct coke is formed which precipitates on the catalyst particles. The (partially) deactivated catalyst particles are removed from the reaction zone, freed from volatile components in a stripping zone, subsequently passed to a regeneration zone and, following their regeneration by combustion of the coke with an oxygen-containing gas, fed back to the reaction zone.

The combustion of the coke in the regeneration zone is attended with the formation of sulphur oxides from sulphur which is present in the coke and originates from sulphur-containing compounds in the hydrocarbon feed. The emission of the sulphur oxides contained in the flue gases from the regenerator is undesirable from a point of view of environmental protection and may be controlled by adding a suitable sulphur oxides absorbent which may be regenerated thermally or chemically and may form part of the catalyst composition.

Use is generally made of metal oxides which in the regeneration zone react with the sulphur oxides to form non-volatile inorganic sulphur compounds. In the reaction zone and in the stripping zone these sulphur compounds are subsequently converted under the influence of hydrocarbons and steam to recover metal oxides and to form a hydrogen sulphide-containing gas. Finally, the hydrogen sulphide-containing gas may be processed in a conventional manner, for instance by the Claus process.

In addition to sulphur-containing compounds hydrocarbon feeds often hold metal-containing compounds. During the conversion of the hydrocarbons the metals from these compounds, such as nickel and vanadium, may precipitate on the catalyst particles and very much contribute to the deactivation of the catalyst.

European Patent Application EP-A 0,045,170 describes a catalyst composition in which, for the purpose of reducing the emission of sulphur oxides, spinel-containing entities are present along with particles which serve to convert hydrocarbons. It has now been found that as compared with the results obtained with the compositions according to EP-A 0,045,170 improved results are obtained when an anionic clay is used as the sulphur oxides binding material. Accordingly, the catalyst composition to which the invention relates is characterized in that the sulphur oxides binding material contains an anionic clay. It appears that the present catalyst composition is not only excellently suitable for use in the conversion of hydrocarbons with attended minimization of the emission of sulphur oxides, but is satisfactorily resistant to deactivation and a reduction of selectivity caused by the precipitation of metals from the hydrocarbon feeds on the catalyst particles. The present catalyst composition is therefore particularly suitable for the conversion of heavy sulphur- and metal-containing hydrocarbon feeds.

It should be added that U.S. Pat. No. 4,497,902 describes a catalyst composition consisting of a physical mixture of particles containing a zeolitically crystalline alumino silicate in a porous matrix, and sulphur oxides binding particles comprising $MgAl_2O_4$ and/or mixtures of alumina and magnesium oxide in combination with at least a free or bound rare earth metal selected from the group consisting of lanthanum, cerium, praseodymium, samarium and dysprosium.

U.S. Pat. No. 4,206,039 relates to a process for catalytically cracking hydrocarbons in which the sulphur oxides form in the regenerator are absorbed by particles containing a rare earth metal or compound thereof and an inorganic oxide such as silica and alumina.

U.S. Pat. No. 4,465,588 relates to the cracking of high metals content hydrocarbon feeds with a catalytic cracking composition containing a cracking catalyst and a diluent comprising a magnesium-containing clay in combination or not with a heat resistant compound. The magnesium-containing clay may be attapulgite, sepiolite, hectorite or chrysotile.

U.S. No. 4,458,026 discloses the use of thermally treated anionic clay as an improved catalyst for the conversion of acetone into mesityl oxide and isophorone, and for the aldol condensation of other carbonyl-containing compounds.

The anionic clay in the catalyst composition according to the invention has a crystal structure which consists of positively charged layers, columns, etc., between which are anions and water molecules, and which are built up of specific combinations of metal hydroxides. Depending on their crystallographic structure these clays are divided into various groups, such as the pyroaurite-sjögrenite-hydrotalcite group, the hydrocalumite group and the ettringite group.

In the pyroaurite-sjögrenite-hydrotalcite group the brucite-like main layers built up of octahedra alternate with interlayers in which water molecules and anions, more particularly carbonate ions, are distributed among the cavities between the octahedra. Among the natural minerals are pyroaurite, hydrotalcite, stichtite, reevesite, eardleyite, sjögrenite, mannaseite and barbertonite. The main layers of these and many other, generally synthetic, members of the group are built up of specific combinations of metal hydroxides derived from on the one hand divalent cations of metals such as Zn, Mn, Fe, Co, Ni, Cu and in particular Mg and on the other from trivalent cations of metals such as Mn, Fe, Co, Ni, Cr and in particular Al. Alternatively, monovalent and trivalent metal cations may be combined in the form of, for instance, lithium and aluminium cations in $[Al_2Li(OH)_6]^+A^-\cdot bH_2O$ (see Clays and Clay Minerals, 30, pp. 180–184, 1982). The interlayers contain anions such as $NO_3^-$, $OH^-$, $Cl^-$, $Br^-$, $I^-$, $SO_4^{2-}$, $SiO_3^{2-}$, $CrO_4^{2-}$, $HPO_4^{2-}$, $MnO_4^-$, $HGaO_3^{2-}$, $HVO_4^{2-}$, $ClO_4^-$, $BO_3^{2-}$, monocarboxylates such as acetate, dicarboxylates such as oxalate, alkyl sulphonates such as lauryl sulphonate and in particular $CO_3^{2-}$.

Hydrocalumite and related synthetic compounds also have a layered structure in which positively charged main layers alternate with interlayers containing anions and water. The main layers are built up from specific combinations of metal hydroxides derived from on the one hand divalent calcium cations and on the other from trivalent cations of metals such as iron, more particularly aluminium. The interlayers contain anions such as $OH^-$, $SO_4^{2-}$, $Cl^-$, $NO_3^-$ and in particular $CO_3^{2-}$.

In the ettringite group the crystal structures are based on positively charged columns between which occur channels containing anions and sometimes also water molecules. The columns are composed of specific combinations of metal hydroxides derived from on the one hand divalent cations of metals such as Sr and in particular Ca and on the other trivalent cations of metals such as Ti, Cr, Mn, Fe, Ga and in particular Al. Instead of trivalent cations the crystal lattice may contain quadrivalent silicium cations.

The natural minerals of this group comprise ettringite, thaumasite, jouravskite, despujolsite, schaurteite and fleischerite.

A detailed description of the pyroaurite-sjögrenite-hydrotalcite group, the hydrocalumite group and the ettringite group is given in Min. Mag. 39, 377–389 (1973).

The anionic clay in the catalyst composition according to the invention preferably has a layered structure corresponding to the general formula $$[M_m^{2+}N_n^{3+}(OH)_{2m+2n}]A_{n/a}^{a-}\cdot bH_2O$$

wherein $M^{2+}$ and $N^{3+}$ represent di- and trivalent cations, respectively, m and n have a value such that $m/n=1$ to 6 and a has the value 1, 2 or 3, and A represents a mono-, di- or trivalent anion and b has a value in the range of from 0 to 10, generally a value of 2 to 6 and often a value of about 4. It is preferred that m/n should have a value of 2 to 4, more particularly a value practically of 3.

Suitable divalent $M^{2+}$ cations are $Mg^{2+}$, $Ca^{2+}$, $Sr^{2+}$, $Ba^{2+}$, $Zn^{2+}$, $Mn^{2+}$, $Fe^{2+}$, $Co^{2+}$, $Ni^{2+}$, $Cu^{2+}$ and combinations thereof. Preference is given to $Mg^{2+}$ and $Ca^{2+}$.

Suitable trivalent $N^{3+}$ cations are $Al^{3+}$, $Mn^{3+}$, $Fe^{3+}$, $Co^{3+}$, $Ni^{3+}$, $Cr^{3+}$, $Ga^{3+}$, $B^{3+}$, trivalent rare earth metal cations such as $La^{3+}$ and $Ce^{3+}$ and combinations thereof. Preferred as $Al^{3+}$, combined or not with $La^{3+}$ and/or $Ce^{3+}$.

Suitable A anions are $NO_3^-$, $OH^-$, $Cl^-$, $Br^-$, $I^-$, $CO_3^{2-}$, $SO_4^{2-}$, $SiO_3^{2-}$, $CrO_4^{2-}$, $HPO_4^{2-}$, $MnO_4^-$, $HGaO_3^{2-}$, $HVO_4^{2-}$, $ClO_4^-$, $BO_3^{2-}$, monocarboxylates, such as acetate, dicarboxylates, such as oxalate, alkyl sulphonates, such as lauryl sulphonate, and combinations thereof. Preferred are $CO_3^{2-}$, $NO_3^-$, $SO_4^{2-}$ and $OH^-$.

Examples are: $[Mg_6Fe_2(OH)_{16}]CO_3\cdot4H_2O$, $[Mg_6Al_2(OH)_{16}]CO_3\cdot4H_2O$, $[Mg_6Cr_2(OH)_{16}]CO_3\cdot4H_2O$, $[Ni_6Fe_2(OH)_{16}]CO_3\cdot4H_2O$, $[Ni_6Al_2(OH)_{16}]CO_3\cdot4H_2O$, $[Fe_4Fe_2(OH)_{12}]CO_3\cdot3H_2O$, $[Ca_2Al(OH)_6](OH)_{0.75}(CO_3)_{0.125}\cdot2.5H_2O$, $[Ca_2Al(OH)_6]OH\cdot6H_2O$, $[Ca_2Al(OH)_6]OH\cdot3H_2O$, $[Ca_2Al(OH)_6]OH\cdot2H_2O$, $[Ca_2Al(OH)_6]OH$, $[Ca_2Al(OH)_6]Cl\cdot2H_2O$, $[Ca_2Al(OH)_6]0.5CO_3\cdot2.5H_2O$, $[Ca_2Al(OH)_6]0.5SO_4\cdot3H_2O$, $[Ca_2Fe(OH)_6]0.5SO_4\cdot3H_2O$, $[(Ni,Zn)_6Al_2(OH)_{16}]CO_3\cdot4H_2O$, $[Mg_6(Ni,Fe)_2(OH)_{16}](OH)_2\cdot2H_2O$, $[Mg_6Al_2(OH)_{16}](OH)_2\cdot4H_2O$, $[(Mg_3Zn_3)Al_2(OH)_{16}]CO_3\cdot4H_2O$, $[Mg_6Al_2(OH)_{16}]SO_4\cdot xH_2O$, $[Mg_6Al_2(OH)_{16}](NO_3)_2\cdot xH_2O$, $[Zn_6Al_2(OH)_{16}]CO_3\cdot xH_2O$, $[Cu_6Al_2(OH)_{16}]CO_3\cdot xH_2O$, $[Cu_6Al_2(OH)_{16}]SO_4\cdot xH_2O$ and $[Mn_6Al_2(OH)_{16}]CO_3\cdot xH_2O$, wherein x has a value of from 1 to 6.

The preparation of anionic clays is described in many prior art publications, particular reference being made to
U.S. Pat. No. 4,458,026

Acta Acad. Aboënsis Math. Phys., VII, 3 (1933)
Helv. Chim. Acta, 25, 106–137 and 555–569 (1942)
J. Am. Ceram. Soc., 42, no. 3, 121 (1959)
Chemistry Letters (Japan), 843 (1973)
Clays and Clay Minerals, 23, 369 (1975)
Clays and Clay Minerals, 28, 50 (1980)
Clays and Clay Minerals, 34, 507 (1986)
Materials Chemistry and Physics, 14, 569 (1986).

Upon being heated, anionic clays will generally decompose readily to some extent. Hydrotalcite $[Mg_6Al_2(OH)_{16}]CO_3\cdot4H_2O$, for instance, begins to lose water from the interlayers in the crystal lattice already at a temperature below 200° C. and carbon dioxide and water from dehydroxylation reactions will escape at a temperature in the range of 250° to 450° C. Both decomposition steps are reversible. At higher temperatures, such as those used in calcining steps and in hydrocarbon conversion operations, decomposition may even go further and be of an irreversible nature. Although the structure of the ensuing decomposition products is unknown, their capacity to bind sulphur oxides is excellent. Since such decompositions may take place during the preparation of the present catalyst compositions and/or during their use a preferred embodiment of the catalyst composition according to the invention resides in that the sulphur oxides binding material contains the anionic clay in a heat treated form, said heat treatment comprising the step of heating anionic clay-containing material at a temperature in the range of from about 300° to about 900° C. It has been found that optimum results are obtained when the heat treatment is applied to an anionic clay-containing material which at least also contains a matrix material in which the anionic clay is embedded.

Main constituents of the sulphur oxides binding material in the catalyst composition according to the invention are the anionic clay and optionally a matrix material. It is preferred that the sulphur oxides binding material should also contain one or more rare earth metals or compounds thereof in an amount of preferably 0.05 to 25, more particularly 1 to 15 and preferably 7 to 12 percent by weight, calculated as the total amount of rare earth metal(s) based on the anionic clay. Preferred rare earth metals are cerium and/or lanthanum in the free or in the bound form.

The rare earth metals may be taken up into the sulphur oxides binding material by coprecipitation of compounds of these metals during the preparation of the anionic clay. Alternatively, the anionic clay may be impregnated preferably with an aqueous solution containing rare earth metal compounds in an amount of, say, 3 to 30 percent by weight. Another alternative consists in that the anionic clay is first embedded in a matrix and subsequently impregnated or that use is made of a matrix material which already contains rare earth metals or compounds thereof.

The rare earth metals cause the stability of the sulphur oxides binding material to increase. Such is particularly the case if these metals have been included in the anionic clay itself by coprecipitation or impregnation. Moreover, the rare earth metals act as promotor for the conversion of the undesirable combustion product $SO_2$ formed in the regeneration of the catalyst. $SO_2$ is oxidized into $SO_3$ which forms adducts with the sulphur oxides binding material that display greater thermal stability than those formed with $SO_2$.

In addition to or instead of said rare earth metals the catalyst composition may contain other oxidation promotors. Particularly suitable are noble metals or compounds thereof falling within group VIII of the periodic system, such as Pt, Pd, Ir, Rh, Os and Ru. Also suitable are Cr and Cu and compounds thereof. It is preferred that use should be made of 0.1-100 ppm, more particularly 0.1-50 ppm, of a noble metal of group VIII. The most preference is given to the use in the catalyst composition of 0.1 to 10 ppm of platinum or palladium. Said metals may be applied to the ready catalyst particles in a known manner, such as by impregnation with an appropriate salt solution, or be added to the catalyst composition in the form of separate particles which consist of, say, platinum or alumina. Or these metals may be incorporated into the sulphur oxides binding material in a way similar to that for the previously mentioned rare earth metals.

As catalytically active material are used porous materials having acid properties. They may be amorphous materials, such as amorphous alumina silicate. It is preferred that use should be made of zeolitic, crystalline alumino silicates, particularly those having a pore diameter of 0.3-1.5 nm. Examples thereof are synthetic faujasites such as X and Y zeolites and further ZSM-5, ZSM-11, ZSM-12, ZSM-22 and hydrothermally and/or chemically modified zeolites. It is preferred that use should be made of the type Y zeolites and hydrothermally and/or chemically modified versions thereof, such as ultrastable zeolites, which are described, among other places, in U.S. Pat. No. 3,293,129, U.S. Pat. No. 3,506,400 and NL 7,604,264 and in Society of Chemical Engineering (London), Monograph Molecular Sieves, p. 186 (1968) by C. V. Mc.Daniel and P. K. Maher.

In order that the required catalytic action may be obtained the cations of these zeolites, which are generally prepared in the sodium form, should be exchanged. For this ion exchange use is often made of solutions containing rare earth metal ions and/or ammonium ions or hydrogen ions. The exchange is generally continued until the zeolites and the ready catalyst contain less than 4% by weight, and preferably less than 0.5% by weight of sodium.

As examples of well-known matrix materials suitable for embedding catalytically active material, more particularly zeolitic crystalline alumino silicates, may be mentioned silica, alumina, magnesia, zirconia, boria, aluminium chlorohydrol and mixtures thereof. Preferred are silica, silica-alumina and alumina.

In addition to the catalytically active material and the sulphur oxides binding material other components may be incorporated into the matrix material. As examples thereof may be mentioned non-anionic clays such as kaolin, bentonite clays as described in U.S. Pat. Nos. 3,252,757, 3,252,889 and 3,743,594, montmorillonite, etc.

To increase the octane number of the gasoline fraction produced alumina particles as described in U.S. Pat. No. 4,182,693 may be incorporated into the catalyst composition.

Further, the catalyst composition may contain usual amounts of one or more passivators, such as antimony, tin, etc. They serve to prevent excessive formation of hydrogen during the conversion of the hydrocarbons.

The various components of the catalyst particles may be combined in a manner known in itself. Suitable methods of preparation are described, among other places, in U.S. Pat. Nos. 3,609,103 and 3,676,330. For instance, the various components may already be combined with the matrix material when this material is in the gelled state.

After proper mixing the catalyst particles are obtained by spray-drying. Alternatively, the components may be added to a matrix material in the form of a sol. This sol binder may subsequently be caused to gel prior to or during spray-drying. This latter embodiment is preferred in that it results in particles having a relatively high density. Apparent densities of over 0.5 g/ml, preferably of over 0.7 g/ml are simple to realize.

The size of the particles may range between wide limits. In a preferred embodiment the particle size is so chosen that the particles are fluidizable. The particles then measure, for instance, of from 20 to 150 microns, preferably 40 to 90 microns.

Practical ways of performing the above-discussed heat treatment of anionic clay-containing materials are, for example:
(i) heating (calcining) anionic clay particles as such;
(ii) heating (calcining) particles comprising the anionic clay embedded in a matrix material;
(iii) adding anionic clay-containing particles to the catalyst inventory of a cracking unit under normal operating conditions.

These or like steps may, of course, be combined.

In a preferred embodiment of the present invention the catalytically active material and the sulphur oxides binding material are collectively present in the matrix.

In another preferred embodiment of the present invention the catalytically active material is physically separated from the sulphur oxides binding material by composing the catalyst of:
(a) catalytically particles comprising the catalytically active material embedded in matrix material;
(b) particles of sulphur oxides binding material comprising the anonic clay embedded or not in matrix material.

The two embodiments will be successively described below.

When the catalytically active material and the sulphur oxides binding material are collectively incorporated in a matrix, the sulphur oxides binding material generally consists of anionic clay particles without separate carrier, since the matrix functions as such.

In this embodiment the catalyst composition contains anionic clay in an amount of 0.1 to 50, preferably 1 to 30, and more particularly 3 to 15 percent by weight, based on the total catalyst composition. Further, the catalytically active material, more particularly the zeolitic material, is present in an amount which will generally be higher according as the feeds to be cracked are heavier and will generally be in the range of 5 to 50, more particularly 10 to 30 percent by weight, based on the total catalyst composition.

The anionic clay is preferably promoted with rare earth metals, more particularly cerium, in a previously indicated manner.

The catalytically active material is preferably a zeolitically crystalline alumino silicate, more particularly a type Y zeolite or an ultrastable zeolite exchanged with rare earth metals and/or ammonium ions or hydrogen ions.

Preferred matrix materials are silica, silica-alumina or alumina, which can best be caused to gel during spray-drying.

It is preferred that the catalyst composition should contain an oxidation promoting metal, more particularly 0.1 to 10 ppm of platinum or palladium.

In a second preferred embodiment the catalyst is composed of:

(a) catalytically active particles comprising the catalytically active material embedded in matrix material;
(b) particles of sulphur oxides binding material comprising the anionic clay embedded or not in matrix material.

This embodiment according to the invention has the advantage that the amount of sulphur oxides binding material to be added can simply be adapted to the hydrocarbon feed to be processed. It is preferred that the anionic clay should be embedded in a matrix material in order to obtain particles of the density, attrition resistance and particle size envisaged.

Very suitable is a physical mixture containing:
(a) catalytically active particles comprising 5 to 80, preferably 10 to 40 percent by weight of catalytically active material, 0 to 60, preferably 20 to 50 percent by weight of non-anionic clay, and 5 to 90, preferably 10 to 30 percent by weight of matrix material;
(b) particles of sulphur oxides binding material comprising 1 to 99, preferably 20 to 80 and more particularly 40 to 70 percent by weight of anionic clay, 0 to 70 percent by weight of non-anionic clay and 1 to 99, preferably 5 to 60, more particularly 8 to 20 percent by weight of matrix material.

It is preferred that the sulphur oxides binding material and particularly the anionic clay therein should be promoted with rare earth metals, such as cerium and/or lanthanum, preferably cerium, in the previously indicated manner. A preferred catalytically active material is a zeolitic, crystalline alumino silicate, more particularly a type Y zeolite or an ultrastable zeolite exchanged with rare earth metals and/or ammonium ions of hydrogen ions. A preferred matrix material to be used in both types of particles is silica, silica-alumina or alumina, which can best be caused to gel during spray-drying.

It is preferred that one or both types of particles of the mixture should contain a noble metal of group VIII of the periodic system. It is preferred that use should be made of platinum or palladium in an amount of 0.1 to 10 ppm, based on the mixture.

The two types of particles may be given different diameters. For instance, the catalytically active particles may have a diameter ranging from 80 to 125 microns and the particles of sulphur oxides binding material a diameter ranging from 30 to 75 microns. It is preferred that the particle size distributions of the two types of particles should be approximately the same.

To increase the octane number of the gasoline product fraction of a feed to be cracked in all 40 and preferably 1 to 15 percent by weight of aluminium oxide particles may be incorporated in the catalyst composition. If the catalyst composition consists of a mixture of catalytically active particles and particles of sulphur oxides binding material, the alumina particles may be incorporated in both types of particles.

The invention also relates to an absorbent for sulphur oxides, which absorbent may be used for treating sulphur oxides-containing gases such as flue gases resulting from combustion processes, for instance flue gases from the regenerator of an FCC plant. The absorbent, which may be in the form of fluidizable particles, extrudates, beads, pellets etc., contains 1 to 99, preferably 20 to 80 and more particularly 40 to 70 percent by weight of anionic clay, 0 to 70 percent by weight of non-anionic clay and 1 to 99, preferably 5 to 60, more particularly 8 to 20 percent by weight of matrix material. The anionic clay, the non-anionic clay and the matrix material have the afore-described composition or preferred composition. The absorbent may be regenerated by using hydrogen, in which process the bound sulphur oxides are converted into a hydrogen sulphide-containing gas. The absorbent may be used as additive in combination with a catalyst for the purpose of converting hydrocarbon feeds. Such a combination results, of course, in a catalyst composition according to the invention.

The catalyst composition according to the invention is suitable to be used in processes for the conversion of hydrocarbons, and particularly in an FCC process for cracking high-boiling hydrocarbons in low-boiling hydrocarbons, such as LPG, gasoline and diesel oil (LCO).

Examples of suitable hydrocarbon feeds are those mentioned in "Fluid catalytic cracking with zeolite catalysts" by P. B. Venuto and E. T. Habib jr. in Chemical Industries, Chapter 6, Series No. 1, published by Marcel Dekker Inc., New York, 1979.

Many hydrocarbon feedstocks have a boiling range of up to over 480° C., a density higher than 900 kg/m$^3$ and a Conradson carbon content of over 1%. An example of such a feed is vacuum gas oil having a boiling range of 300°–600° C., mixed or not with sulphur and metal-containing residues, such as an atmospheric residue.

The hydrocarbon feedstocks generally contain variable amounts of sulphur. The catalyst composition according to the invention is suitable notably for cracking sulphur-containing hydrocarbon feeds, i.e. feeds containing at least 0.001 and preferably more than 0.01, more particularly more than 0.1 up to over 5 percent by weight of sulphur. In addition to sulphur hydrocarbon feeds often contain metals (iron, vanadium, nickel, copper, etc.) in an amount higher than 0.1 ppm, more particularly higher than 1 ppm. Heavy residual hydrocarbon fractions may contain more than 100 ppm of metals. The present catalyst composition displays satisfactory resistance to deactivation caused by metals contained in the hydrocarbon feeds.

Catalytic cracking of feeds is generally conducted at a temperature in the range of 375° to 650° C., more particularly 460° to 560° C. The pressure applied is generally between atmospheric pressure and a pressure of 7 atmospheres, more particularly between 1 and 3 atmospheres. Oxidative regeneration of the catalyst composition with oxygen-containing gas is generally carried out at 540° to 825° C., more particularly 700° to 750° C. and in the presence of steam.

EXAMPLE 1

In this Example the prepration of several anionic clays is described.

Preparation of Clays Having a Hydrotalcite-Like Structure

A 20 l stainless steel reaction vessel was charged with 5000 ml of demineralized water. After heating the water to 65° C. there were added to it over a period of 1 hour and with stirring a solution of 2.5 moles of Al(NO$_3$)$_3$.9-H$_2$O and 7.5 moles of Mg(NO$_3$)$_2$.6H$_2$O in 5000 ml of demineralized water and a 50 wt.% solution of sodium hydroxide in water, the latter solution in such a quantity as to ensure that a reaction mixture pH of about 10 was obtained. The resulting reaction mixture was aged for one hour at 65° C. Subsequently, the precipitate was filtered and washed with demineralized water. After drying at 120°–125° C. the product was subjected to chemical and X-ray analysis which confirmed the hydrotalcite-like structure (abbreviated: HT-NO₃).

The corresponding sulphate (HT-SO₄) was prepared in the same way as described for HT-NO₃, except that
the reaction vessel was initially charged with 3000 ml of demineralized water instead of 5000 ml;
the solution containing magnesium nitrate and aluminium nitrate was replaced with the following two solutions: (i) a solution of 20 moles of $MgSO_4.7H_2O$ in 7000 ml of demineralized water; and (ii) 1560 ml of a solution in demineralized water of sodium aluminate containing 6.66 moles of said aluminate calculated as $NaAlO_2$.

$[Al_2Li(OH)_6]_2CO_3$ (abbreviated: HT-AlLi) was prepared in the same way as described for HT-NO₃, except that (i) the amount of the aluminium nitrate used was 2 moles instead of 2.5 moles and (ii) the magnesium nitrate was replaced with 1 mole of $LiNO_3$.

The structures of both HT-SO₄ and HT-AlLi were confirmed by chemical and X-ray analysis.

Preparation of a Clay Having a Hydrocalumite Structure

A 10 l stainless steel reaction vessel was charged with 1500 ml of demineralized water. The water was heated to 65° C., after which there were added to it over a period of 30 minutes and with stirring a solution of 1.0 mole of $Ca(NO_3)_2.4H_2O$ and 0.5 moles of $Al(NO_3)_3.6H_2O$ in 1000 ml of demineralized water and such an amount of a 50 wt.% NaOH solution in water as to result in a pH of 10 in the reaction mixture. The resulting reaction mixture was stirred for another 1.5 hrs at 65° C. Subsequently, the precipitate was filtered off, washed with demineralized water and, finally, dried at 125° C. The product obtained (HC) had the hydrocalumite structure, as was confirmed by X-ray and chemical analysis.

Preparation of a Clay Having an Ettringite Structure

A 20 l stainless steel reaction vessel was charged with a mixture of 800 g of crushed ice (made from demineralized water) and 1200 ml of demineralized water. Over a period of one hour there were added to it, with stirring, a solution of 2 moles of $Al(NO_3)_3.6H_2O$ and 6 moles of $Ca(NO_3)_2.4H_2O$ in 2000 ml of demineralized water, a solution of 3 moles of $Na_2SO_4$ in 2000 ml of demineralized water and such an amount of an aqueous solution of 50 wt.% NaOH as to result in a pH of 10 in the reaction mixture. After the addition of the various ingredients the temperature of the reaction mixture was about 25° C. At this temperature stirring was continued for another hour.

Subsequently, the resulting precipitate was filtered off, washed with demineralized water and, finally, dried for 4 hrs at 120° C. The product obtained (ET) displayed the ettringite structure, as was verified by X-ray and chemical analysis.

EXAMPLE 2

Preparation of Catalyst Compositions (Physical Mixtures)

Use being made of the clays HT-SO₄, HT-AlLi, HC and ET described in Example 1, four catalyst compositions according to the invention were prepred consisting of:
(a) 95 wt.% of KMC-25P, a standard FCC catalyst (ex Ketjen Catalysts, The Netherlands) containing 5 ppm of platinum oxidation promotor and having the following particle size distribution:

| μm | <20 | <40 | <80 | <105 | <149 |
|---|---|---|---|---|---|
| % | <4 | 19 | 66 | 89 | 98 |

(b) 5 wt.% of fluidizable particles consisting of 60 wt.% of the anionic clay and 40 wt.% of a matrix in which the clay was embedded, said matrix consisting of 75 wt.% of kaolin clay and 25 wt.% of alumina derived from aluminium chlorohydrol, the particle size distribution of said fluidizable particles being as follows:

| μm | <20 | <40 | <80 | <105 | <149 |
|---|---|---|---|---|---|
| % | <2 | 12 | 53 | 67 | 98 |

The preparation of the fluidizable anionic clay-containing particles (b) was carried out employing conventional techniques and involved
preparing an aqueous slurry containing the anionic clay, the kaolin clay and the aluminium chlorohydrol in the desired proportions;
milling the slurry;
spray drying the milled slurry; and
calcining the spray dried particles for about 2 hrs at 600° C.

For testing purposes the resulting calcined particles were subjected to a heat treatment for 17 hrs at 795° C. in a fluidized bed in the presence of 100% steam, thus simulating a long stay in the regeneration zone of an FCC unit. The same simulation treatment was applied to a batch of fresh KMC-25P catalyst. Subsequently, catalyst compositions were prepared by mixing appropriate amounts of steam-treated anionic clay-containing particles and steam-treated FCC catalyst particles.

Test Procedure

The following test procedure was used to determine the sulphur oxides binding properties of the catalyst compositions.

Eight (8) grams of a fluidizable catalyst composition were heated to 675° C. in a fluidizable bed and contacted, over a multitude of cycles, successively with
a gas stream containing 0.2 vol.% of $SO_2$, 1 vol.% of $O_2$ and 98.8 vol.% of $N_2$ during 10 min;
an air stream for 5 min;
a nitrogen stream for 5 min;
a hydrogen stream for 10 min; and
a nitrogen stream for 5 min.

The flow rate of each stream was 145 ml/min.

The passage of air serves to liberate physically absorbed sulphur oxides from the test equipment; the passage of nitrogen gas serves to prevent oxygen and hydrogen from being mixed in the test equipment; and the hydrogen gas serves to liberate the catalyst composition from bound sulphur oxides.

The amount of sulphur oxides bound by the catalyst particles was determined indirectly by analysis of the $SO_2$-containing gas stream using conventional titration techniques employing aqueous solutions of $H_2O_2$ and, for back-titration purposes, aqueous solutions of NaOH. It was found that during the first few cycles the amount of sulphur oxides bound tended to fluctuate.

However, after 3 cycles constant or slowly decreasing readings—depending on the nature of the sulphur oxides binding material used—were reproducibly obtained.

In the Tables below one or more of the following data are given:

% of $SO_x$ (sulphur oxides) bound after 5 cycles, i.e. the proportion of sulphur oxides bound by the catalyst during the fifth cycle;

% of $SO_x$ bound after 30 or 120 cycles, i.e. the proportion of sulphur oxides bound by the catalyst during the 30$^{th}$ or the 120$^{th}$ cycl; these data are of importance to access the resistance to deactivation of the material in question by repeated cycles of binding sulphur oxides and liberating sulphur oxides.

The test results obtained with the four above-described catalyst compositions according to the invention after 5 cycles of gas streams are given in Table 1, each catalyst composition being denoted by the anionic clay used in it (experiments 2-1 to 2-4). For comparative purposes the Table also gives the test results obtained by just using the KMC-25P catalyst (experiment 2-5).

TABLE 1

| Exp. | Clay | % $SO_x$ bound after 5 cycles |
| --- | --- | --- |
| 2-1 | HT-SO$_4$ | 90 |
| 2-2 | HT-AlLi | 58 |
| 2-3 | HC | 74 |
| 2-4 | ET | 72 |
| 2-5* | none | 30 |

*Comparative experiment: only KMC-25P was used.

In the following Examples any reference to Example 2 means that the preparative and/or testing procedures employed were the same as those described in Example 2, except, of course, for the differences as indicated. Further, the particle size distributions of the components making up the catalyst compositions described in Examples 3-6 and 8, viz. the components containing the catalytically active material and the components containing the sulphur oxides binding material(s), were in the same ranges as those given in Example 2 under (a) and (b), respsectively.

EXAMPLE 3

In this Example the sulphur oxides binding properties of a catalyst composition in accordance with the invention are compared with those of certain prior art materials and the unique relationship between anionic clay structure and sulphur oxides binding capacity is demonstrated. The catalyst composition according to the invention (experiment 3-1 was the same as the one described in experiment 2-1 of Example 2, i.e. 95 wt.% of KMC-25P;

5 wt.% of fluidizable particles composed of 60 wt.% of HT-SO$_4$ and 40 wt.% of a matrix in which the HT-SO$_4$ was embedded, said matrix consisting of 75 wt.% of kaolin clay and 25 wt.% of aluminium chlorohydrol-derived alumina. It should be noted that said HT-SO$_4$-containing particles contain Mg and Al originating from HT-SO$_4$ in amounts, calculated as the oxides, of 30 wt.% of MgO and 13 wt.% of Al$_2$O$_3$. It should further be noted that the prior art advocates the use, as sulphur oxides-binding material, of, inter alia, MgAl$_2$O$_4$-spinel (see EP-A 0 045 170), MgO (see for example U.S. Pat. No. 4,153,535) and particulate gamma alumina (see for example U.S. Pat. No. 4,115,251). For comparative purposes, therefore, catalyst compositions containing such prior art materials were prepared, use being made of procedures analogous to those described in Example 2.

For experiment 3-2 the following composition was used.

95 wt.% of KMC-25P;

5 wt.% of fluidizable particles consisting of 43 wt.% of MgAl$_2$O$_4$-spinel and 57 wt.% of a matrix in which the spinel was embedded, said matrix consisting of 82.5 wt.% of kaolin clay and 17.5 wt.% of aluminium chlorohydrol-derived alumina.

For example 3-3 the following composition was used.

95 wt.% of KMC-25P;

5 wt.% of fluidizable particles consisting of 30 wt.% of particulate MgO, 13 wt.% of particulate gamma alumina and 57 wt.% of a matrix in which said MgO and said gamma alumina were embedded, said matrix consisting of 82.5 wt.% of kaolin clay and 17.5 wt.% of aluminium chlorohydrol-derived alumina.

The catalyst compositions in question were subjected to the test procedure described in Example 2. The results are listed in Table 2 below.

TABLE 2

| | | % $SO_x$ bound after | |
| --- | --- | --- | --- |
| Exp. | Clay/Additive | 5 cycles | 30 cycles |
| 3-1 | HT-SO$_4$ | 90 | 72 |
| 3-2* | MgAl$_2$O$_4$-spinel | 37 | —+ |
| 3-3* | MgO + gamma Al$_2$O$_3$ | 76 | 43 |

*Comparative experiments
+Not measured

EXAMPLE 4

Table 3 below lists the results of experiments carried out using the procedures described in Example 2 and employing catalyst compositions similar to the one used in experiment 2-1, except that the anionic clay used therein—HT-SO$_4$ having a Mg:Al atomic ratio of 3:1—was replaced with hydrotalcite-like clays having different Mg:Al atomic ratios. In experiment 4-1 the clay used had a Mg:Al atomic ratio of 1.5:1 and in experiment 4-2 the clay used had a Mg:Al atomic ratio of 4.4:1. Both clays were prepared as outlined in Example 1 for HT-SO$_4$, except that appropriate amounts of magnesium sulphate and sodium aluminate were employed.

TABLE 3

| Exp. | Clay; Mg:Al | % $SO_x$ bound after 5 cycles |
| --- | --- | --- |
| 4-1 | HT-SO$_4$; 1,5:1 | 84 |
| 4-2 | HT-SO$_4$; 4,4:1 | 87 |

EXAMPLE 5

Table 4 below, third column, lists the results of experiments carried out using the procedures described in Example 2 and employing catalyst compositions similar to the one used in experiment 2-1, except that (i) the standard catalyst KMC-25P was replaced with KMC-25 (ex. Ketjen Catalysts, The Netherlands) which only differs from KMC-25P in that it contains no platinum promotor; and (ii) the anionic clay—HT-SO$_4$ having an $M^{2+}:N^{3+}$ atomic ratio of 3—was replaced in experiments 5-1 to 5-7 with some other hydrotalcite-like clay also having an $M^{2+}:N^{3+}$ atomic ratio of 3 and having the characteristic as set out below.

In experiment 5-1 use was made of HT-NO$_3$, the preparation of which is described in Example 1.

In experiments 5-2 to 5-7 use was made of clays similar to HT-NO₃, except that in these clays the $Mg^{2+}$ or $Al^{3+}$ ions had been partly replaced with other divalent or trivalent ions. The synthesis of these clays was carried out using the procedure set out in Example 1 for HT-NO₃, except that part of the magnesium nitrate or aluminium nitrate was replaced with an appropriate amount of the nitrate salt of the replacement ion envisaged. In Table 4 the replacement ions used are mentioned along with the amounts—calculated as metal oxide—in which they are contained in the resulting clay in wt.%.

In comparative experiment 5-8 use was made of a catalyst composition similar to the one employed in experiments 5-1 to 5-7, except that the anionic clay had been replaced with a magnesium, aluminium-containing spinel which further contained 7 wt.% of cerium, calculated as $Ce_2O_3$ and based on said cerium-containing spinel, in accordance with EP-A 0 110 702. In comparative experiment 5-9 use was made of the standard FCC particles only.

The object of these experiments was to investigate whether, and if so, to what degree the replacement ions in question, which ions had been selected on the basis of their known redox capabilities, are capable of oxidizing the $SO_2$ into $SO_3$ and hence to assist in binding the sulphur oxides. As follows from the results in the third column of Table 4, the most favourable results were obtained with cerium (exp. 5-7). It further follows from a comparison between the experiments 5-1 and 5-8 that even the HT-NO₃-containing catalyst composition displayed far better properties than the composition according to EP-A 0,110,702 containing a cerium-promoted spinel.

The oxidation efficiency of several of the replacement ions in question was further assessed by substituting the platinum-promoted KMC-25P catalyst in the respective catalyst compositions for the KMC-25 catalyst. The test results are given in the fourth column of Table 4.

TABLE 4

| | | % SO$_x$ bound after 5 cycles using as catalyst | |
|---|---|---|---|
| Exp. | Clay (replacement ion) (wt. %) | KMC-25 | KMC-25P |
| 5-1 | HT-NO₃ | 50 | 90 |
| 5-2 | HT-NO₃ ($Cu^{2+}$) (6.4 as CuO) | 50 | 71 |
| 5-3 | HT-NO₃ ($Fe^{2+}$) (8.6 as Fe₂O₃) | 66 | 78 |
| 5-4 | HT-NO₃ ($Fe^{3+}$) (5.6 as Fe₂O₃) | 65 | —+ |
| 5-5 | HT-NO₃ ($Cr^{3+}$) (2.6 as Cr₂O₃) | 60 | —+ |
| 5-6 | HT-NO₃ ($Mn^{2+}$) (10.8 as MnO) | 70 | —+ |
| 5-7 | HT-NO₃ ($Ce^{3+}$) (6.5 as Ce₂O₃) | 93 | 93 |
| 5-8* | Mg, Al-spinel ($Ce^{3+}$) (7 as Ce₂O₃) | 23 | —+ |
| 5-9** | none | 11 | 30 |

*Comparative run in accordance with EP-A 0,110,702;
**Comparative runs; only KMC-25 or KMC-25P was used
+Not measured

EXAMPLE 6

Catalyst compositions similar to the one used in experiment 2-1 of Example 2 were prepared, except that (i) they contained the KMC-25P catalyst in an amount of 90 wt.% and the fluidizable HT-SO₄-containing particles in an amount of 10 wt.% and (ii) said fluidizable HT-SO₄-containing particles had been provided with rare earth metal oxides by subjecting the HT-SO₄-containing particles, after spray drying and calcination (cf. Example 2), to a standard impregnation step employing aqueous solutions of rare earth metal salts followed by a second calcination step (600° C., 2 hrs).

The rare earth metal salts used are given in Table 5, together with their amounts in wt.% based on the impregnated particles and calculated as RE₂O₃. The sulphur oxides binding properties were determined in accordance with the test procedure described in Example 2. The results after 120 cycles of gas streams are listed in Table 5. The Table also contains the results obtained with a catalyst composition containing 90 wt.% of KMC-25P and 10 wt.% of HT-SO₄-containing fluidizable particles which had not been provided with rare earth metal oxide (experiment 6-1) and, for comparative purposes, the results obtained by just using the KMC-25P catalyst (experiment 6-7).

TABLE 5

| Exp. | Clay impregnated with | Wt. % RE₂O₃ | % SO$_x$ bound after 120 cycles |
|---|---|---|---|
| 6-1 | no impregnation | 0 | 55 |
| 6-2 | Ce(NO₃)₃.6H₂O | 7 | 89 |
| 6-3 | La(NO₃)₃.6H₂O | 7 | 58 |
| 6-4 | mixture A* | 7 | 84 |
| 6-5 | mixture A* | 2 | 61 |
| 6-6 | mixture B** | 7 | 86 |
| 6-7+ | — | — | 15 |

*Mixture A: LaCl₃, 53 wt. %; CeCl₃, 18 wt. %; PrCl₃, 10 wt. %; NdCl₃, 18 wt. %
**Mixture B: La(NO₃)₃, 13 wt. %; Ce(NO₃)₃, 72 wt. %; Pr(NO₃)₃, 1 wt. %; Nd(NO₃)₃, 14 wt. %
+Comparative experiment, only KMC-25P was used

EXAMPLE 7

Employing conventional procedures a fluidizable catalyst composition according to the invention was prepared which contained 10 wt.% of cerium impregnated fluidizable HT-SO₄-containing particles as described for experiment 6-2 in Example 6, 20 wt.% of an ultrastable Y zeolite and 70 wt.% of a matrix in which said particles and said zeolite were embedded, said matrix consisting of 85 wt.% of kaolin clay and 15 wt.% of aluminium chlorohydrol-derived alumina. After spray drying and calcination the catalyst composition displayed the following particle size distribution:

| μm | <20 | <40 | <80 | <105 | <149 |
|---|---|---|---|---|---|
| % | 1 | 16 | 64 | 73 | 98 |

Use being made of conventional techniques, the particles were subsequently impregnated with an aqueous solution of chloroplatinic acid. After drying and calcining the resulting particles contained 5 ppm of platinum with respect to the final particles and calculated as elemental platinum. Finally, the catalyst was subjected to the heat treatment in the presence of steam and to the test procedure as outlined in Example 2. During the 5th cycle of gas streams the catalyst had absorbed 61% of the sulphur oxides.

EXAMPLE 8

This Example described test results obtained in a circulating fluid bed catalytic cracking pilot plant. In such a plant the catalyst particles are contacted with a hydrocarbon feed in a reaction zone under cracking conditions. Owing to coke deposition the catalyst particles gradually become deactivated. Subsequently, the catalyst particles are removed from the reaction zone and introduced into a stripping zone where they are freed from volatile components. From the stripping zone the particles are passed to a regeneration zone for combustion of the coke with an oxygen-containing gas. Finally, the resulting, regenerated catalyst particles are fed back to the reaction zone.

When use is made of a sulphur-containing feed the coke combustion is attended with the formation of sulphur oxides. In general, and depending on the nature of the catalyst used, part of the sulphur oxides is bound to the catalyst particles, and is consequently fed back to the reaction zone, and the remaining part is emitted from the regeneration zone along with the flue gas.

The experiment was carried out using the following conditions and feedstock.

| | |
|---|---|
| Reactor temperature | 545° C. (inlet)–520° C. (outlet) |
| Stripper temperature | about 500° C. |
| Regenerator temperature | about 700° C. |
| Feed rate | about 12 g/min |
| Catalyst to oil ratio | about 6 |
| Vol. % $O_2$ in regenerator | about 3 |
| Stripper steam | about 0.25 g/min |
| Pressure | about 1 atmosphere |
| Feed preheat temperature | about 275° C. |
| Reaction time | about 10 sec |
| Stripping time | about 10 min |
| Regeneration time | about 30 min |
| Feedstock | Kuwait VGO |
| S-content | 2.9 wt. % |
| Density | 940 kg/m³ |
| Conradson Carbon Residue | 0.63 wt. % |
| Initial boiling point | 370° C. |
| Final boiling point | 562° C. |

The experiment was started utilizing a commercially available standard FCC catalyst consisting of an ultrastable Y zeolite embedded in a silica-alumina matrix having a low alumina content, which catalyst had previously been hydrothermally deactivated to the activity level prevailing during normal commercial FCC operation. Analysis of the flue gas from the regenerator under steady state operating conditions revealed that it contained about 0.12 vol.% of sulphur oxides.

Subsequently, a fluidizable, anionic clay-containing additive was added to the catalyst inventory in an amount of 10 wt.%, based on said inventory. The additive concerned was similar to that described for experiment 6-2 in Example 6, viz. cerium-promoted HT-$SO_4$-containing particles containing 7 wt.% of $Ce_2O_3$, 56 wt.% of HT-$SO_4$ and 37 wt.% of matrix material, except that it had been subjected to different steam deactivation conditions, viz. 100% steam for 5 hrs at 760° C. (instead of 100% steam for 17 hrs at 795° C.). After again reaching steady state operating conditions the emission of sulphur oxides had been dramatically reduced, the flue gas from the regenerator now only containing about 0.03 vol.% of sulphur oxides, viz. a reduction of about 75%. Moreover, after 5 days of continued operation the flue gas still contained only 0.03 vol.% of sulphur oxides.

Finally, it was observed that the use during cracking operations of anionic clays in accordance with the invention has no negative influence on product yields and selectivities.

I claim:

1. A process comprising treating a gas which contains $SO_2$, $SO_3$ or a mixture thereof with an absorbent comprising 1 to 99 percent by weight of an anionic clay, and 1 to 99 percent by weight of matrix material, wherein said anionic clay has a crystalline structure of the pyroaurite-sjogrenite-hydrotalcite group, the hydrocalumite group or the ettringite group.

2. A process according to claim 1 wherein, the matrix material consists of silica, silica-alumina or alumina.

3. A process according to claim 1, wherein said absorbent further comprises non-anionic clay comprising up to 70 percent by weight of said absorbent.

4. A process according to claim 3 wherein the anionic clay has a composition which corresponds to the general formula

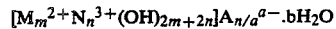

$$[M_m^{2+}N_n^{3+}(OH)_{2m+2n}]A_{n/a}^{a-} \cdot bH_2O$$

wherein $M^{2+}$ and $N^{3+}$ represent di- and trivalent cations, respectively, m and n have a value such that $m/n = 1$ to 6 and a has the value 1, 2 or 3, and A represents a mono-, di- or trivalent anion and b has a value in the range of from 0 to 10.

5. A process according to claim 4, wherein $m/n = 2$ to 4.

6. A process according to claim 4, wherein M represents one or more metals selected from the group consisting of Ca and Mg, and N represents Al or Al in combination with La and/or Ce.

7. A process according to claim 4, wherein A represents one or more anions selected from the group consisting of $CO_3^{2-}$, $NO_3^-$, $SO_4^{2-}$ and $OH^-$.

8. A process according to claim 4 the anionic clay has been heat treated.

9. A process according to claim 1 wherein the sulphur oxides binding material contains one or more rare earth metals or compounds thereof in an amount of 0.05 to 25 percent by weight, calculated as the total amount of rare earth metal(s) based on the anionic clay.

* * * * *

UNITED STATES PATENT AND TRADEMARK OFFICE
CERTIFICATE OF CORRECTION

PATENT NO. : 4,952,382

DATED : August 28, 1990

INVENTOR(S) : Emanuel H. van BROEKHOVEN

It is certified that error appears in the above-identified patent and that said Letters Patent is hereby corrected as shown below:

Column 11, line 10, change "cycl," to --cycle,--.

Column 12, in TABLE 3, line 50, change "1,5:1" to --1.5:1--.

line 51, change "4,4:1" to --4.4:1--.

Column 16, Claim 2, line 20, change "1" to --1,--; change "wherein," to --wherein--.

Claim 4, line 25, change "3" to --3,--.

Claim 8, line 45, after "4" insert --, wherein--.

Claim 9, line 47, change "1" to --3,--.

Signed and Sealed this

Fifth Day of May, 1992

Attest:

DOUGLAS B. COMER

*Attesting Officer*　　　*Acting Commissioner of Patents and Trademarks*